Jan. 29, 1952     D. S. BROWN ET AL     2,583,725
AGITATING DEVICE FOR LIQUID CONTAINING TANKS
Filed Aug. 9, 1948     4 Sheets-Sheet 1
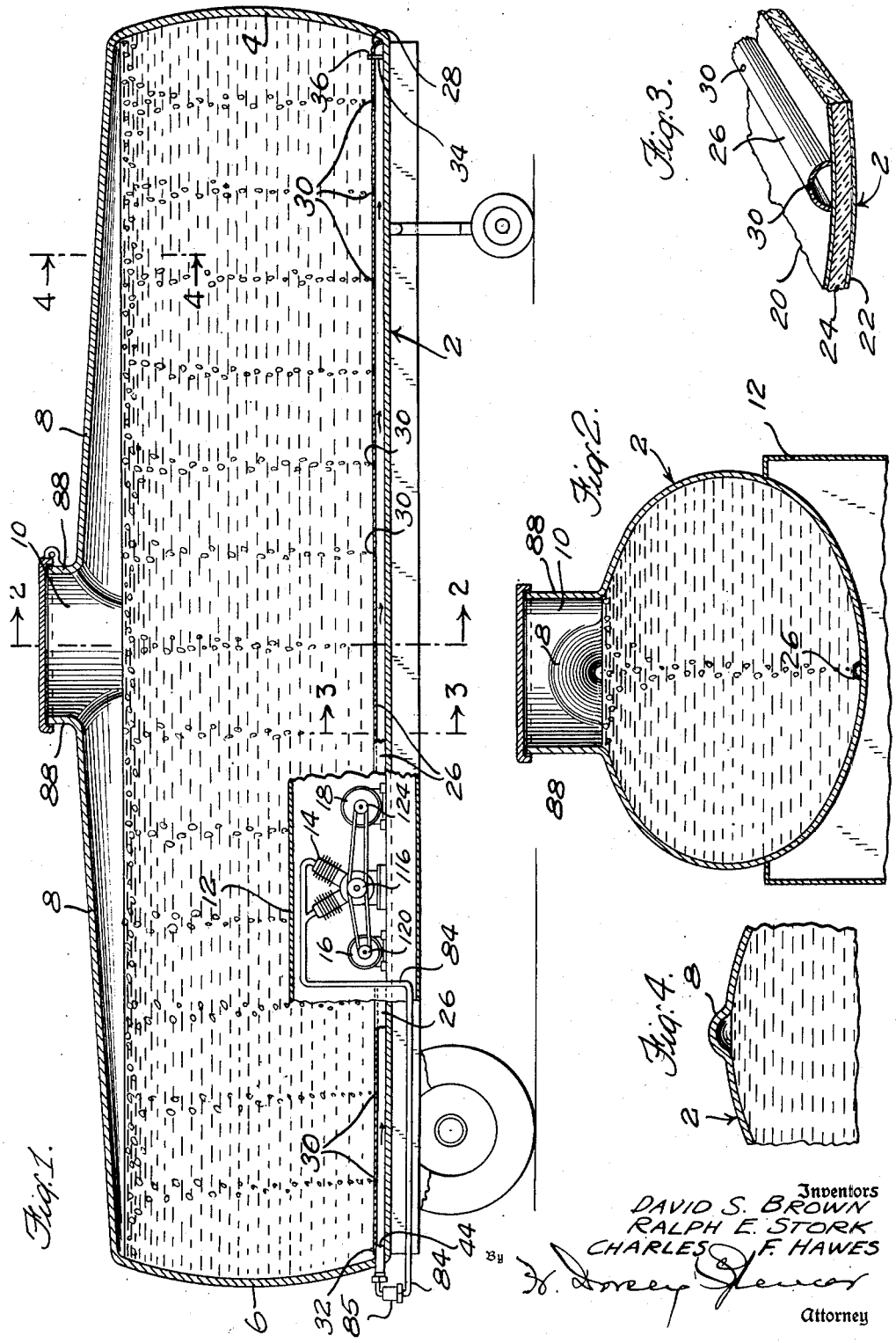
Inventors
DAVID S. BROWN
RALPH E. STORK
CHARLES F. HAWES
Attorney Jan. 29, 1952  D. S. BROWN ET AL  2,583,725
AGITATING DEVICE FOR LIQUID CONTAINING TANKS
Filed Aug. 9, 1948  4 Sheets-Sheet 2
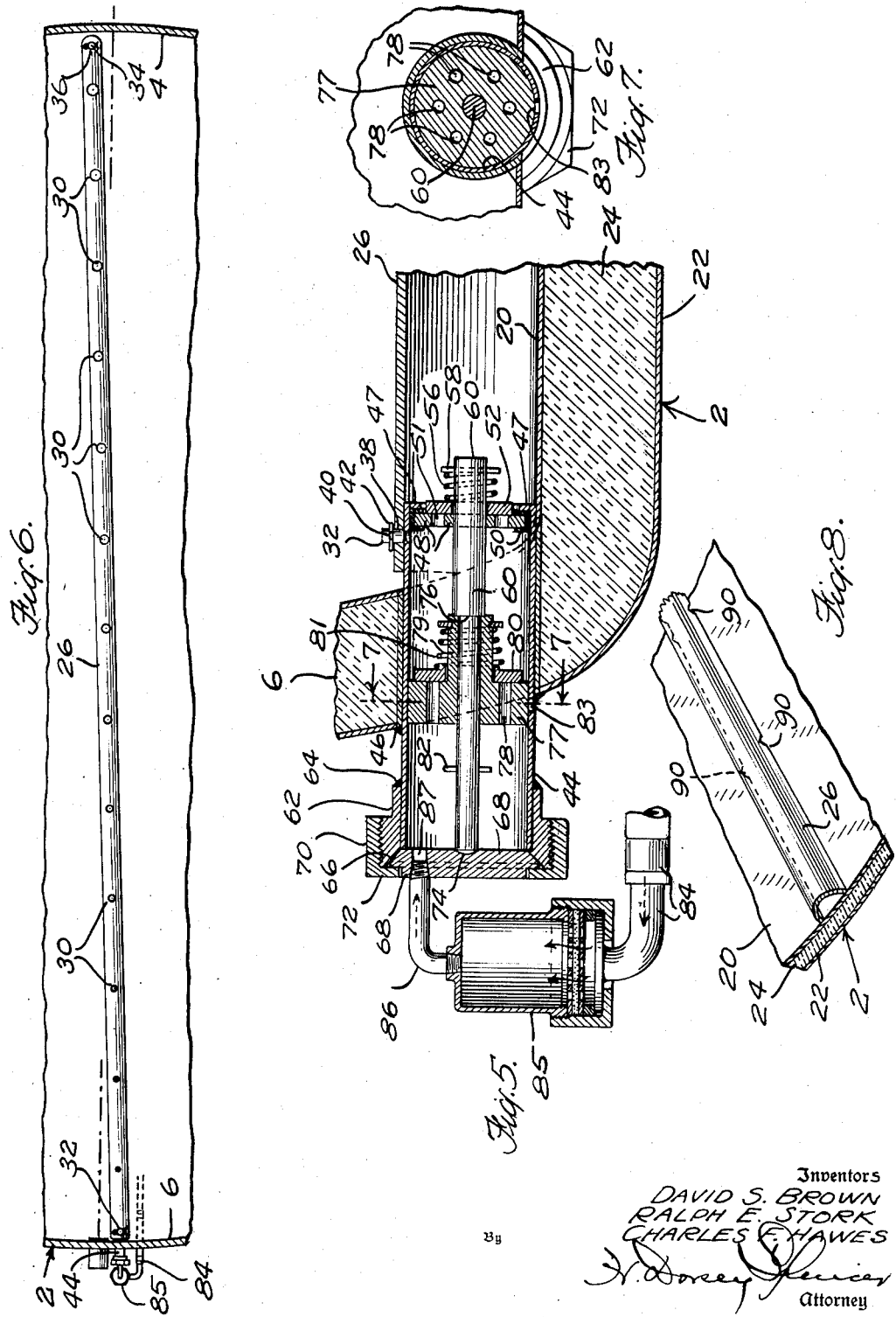
Inventors
DAVID S. BROWN
RALPH E. STORK
CHARLES F. HAWES
Attorney

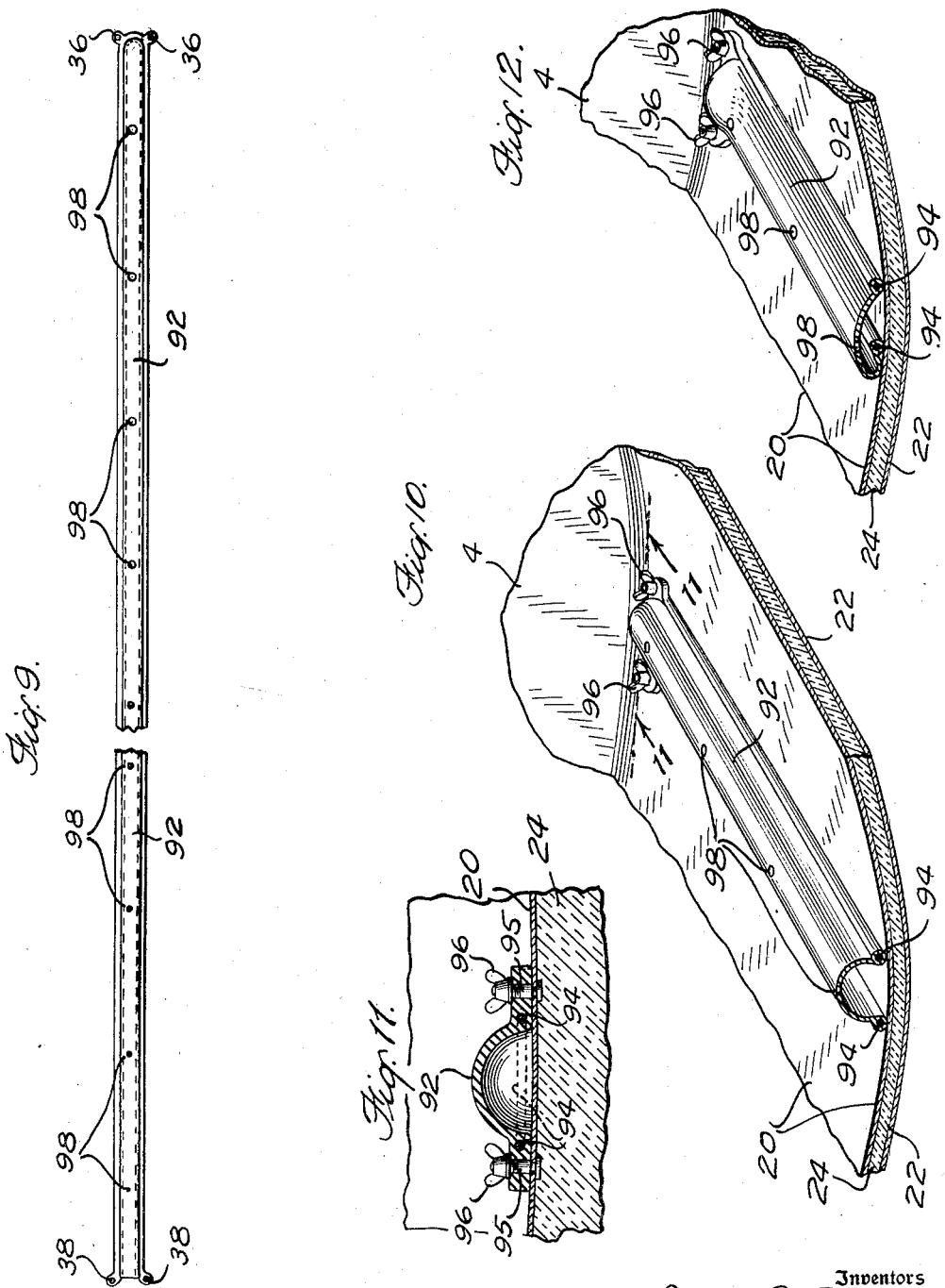

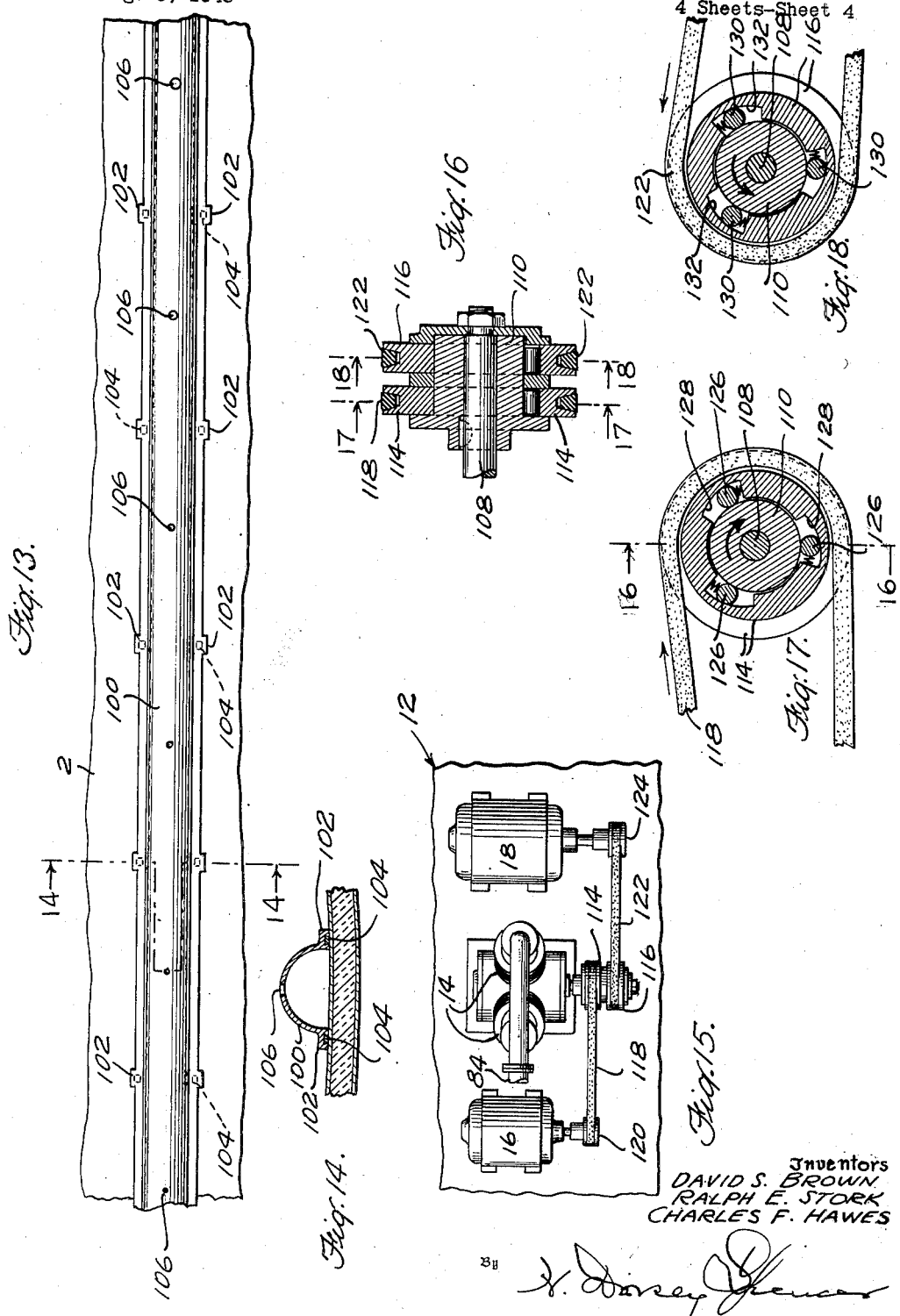

Patented Jan. 29, 1952

2,583,725

UNITED STATES PATENT OFFICE 2,583,725

AGITATING DEVICE FOR LIQUID CONTAINING TANKS

David S. Brown, Plainfield, N. J., Charles F. Hawes, New York, N. Y., and Ralph E. Stork, Hohokus, N. J.

Application August 9, 1948, Serial No. 43,232

2 Claims. (Cl. 261—124)

This invention relates to means for effecting a thorough agitation of the liquid contents of a liquid containing tank and is shown more particularly in its application to the agitation of raw milk in the large stainless steel tanks in which milk is now quite generally transported from the country receiving stations to city pasteurizing and bottling plants.

The milk tanks in which raw milk is transported, as aforesaid, are usually of considerable capacity, varying from a low capacity of around 2100 gallons up to several times this capacity, the average being between 3000 and 3500 gallons, and they are mounted usually either on automobile truck trailers or on railway cars. The raw milk is introduced into the tanks at a relatively low temperature and the tank walls are so insulated that a relatively low temperature is maintained throughout the travel of the tank, the low temperature serving two ends, both to prevent the growth of bacteria in the milk and to prevent the clotting of the butterfat content of the milk and its churning into lumps by reason of the movements of the milk in the tank incidental to its transportation over the highways or railroads. There is, however, a tendency of the cream content of raw milk to rise toward the surface of the milk in the tank so that the upper portions of the contents of the tank, if the contents be not thoroughly stirred, will have a much higher butterfat content than the lower portions of the tank contents.

The raw milk thus brought from the country collecting stations is frequently delivered from a single tank to a number of different pasteurizing and bottling plants operated either by the same or by different proprietors and, therefore, unless means be provided for agitating the tank contents just before delivery of a part thereof to a pasteurizing and bottling plant the butterfat content of the milk delivered to different treating plants would undoubtedly vary considerably. Various means have been devised for effecting such needed agitation of raw milk in the transporting tanks just prior to delivery of a portion thereof to a plant but the majority of such means, usually involving the use of stirring mechanisms of the propeller type, either require too much time for effecting a satisfactory agitation of the tank contents or they fail to produce a uniform dispersion of the butterfat content of the milk throughout all parts of the milk in the tank.

A general object of the present invention is to provide improved liquid agitating means which will not only effect a thorough and uniform dispersion of the butterfat throughout the entire milk content of the tank but also effect such thorough and uniform dispersion in considerably less time than is possible with existing agitating means.

To this end the invention aims to provide means for so introducing a suitable agitating gas, for example, filtered air, into the tank that the gas agitation may take place simultaneously throughout the length of the tank and transversely through the contents thereof in such manner that no part of the tank contents can escape agitation.

It is of course important, in the designing of any mechanism that comes into contact with milk, that it be readily sterilizable and this is particularly true of mechanism to be inserted into one of the large stainless steel tanks employed in the transportation of raw milk for agitating the contents thereof, some of these tanks being as much as 38 feet long and, therefore, requiring naturally considerable agitation of the contents thereof to effect a thorough dispersion of the butterfat throughout the milk. One of the objects of the present invention, therefore, is to provide agitating means that is easily removable for sterilization and is less bulky than existing means, whereby it requires less sterilizing effort and less effort for its removal.

An important feature of the invention is the employment of an open-sided conductor for the agitating gas, either the liquid to be agitated or the tank bottom acting to complete a conduit for the agitating gas when the conductor is submerged therein with its open side down.

Another important feature of the invention is the progressive increase in the sizes of the jet openings in the gas conductor through which the agitating gas escapes into the liquid, such increase proceeding from the point of entrance of the gas into the conductor to the remote closed end of the conductor, whereby substantially uniform distribution of the gas throughout the length of the liquid contents of the tank is obtained.

When the present invention is employed to agitate the milk contents of a portable milk tank, the passage of the air or other suitable agitating gas through the milk not only effects the dispersion of the butterfat content of the milk uniformly throughout the milk but also effects some aeration of the milk, that is, a dispersion of some of the air in small bubbles throughout the milk. To avoid slopping and splashing as an incidental result of such aeration, particularly when the agitation is effected while the tank is being transported, the invention contemplates a modification of the existing milk tanks by providing an anti-slop and anti-splash dome into which the agitating gas may be discharged as it emerges from the upper surface of the milk and by locating the usual manhole at the highest point of this dome.

An important feature of the invention is the shape of the anti-splash and anti-slop dome, which is located midway of the ends of the tank and has the manhole for the tank located therein at its highest point, the dome itself tapering in both transverse dimensions from the manhole to the curved transverse section of the tank near the tank ends.

Other objects, important features and advantages of the invention, to which reference has not hereinabove specifically been made, will appear hereinafter when the following description and claims are considered in connection with the accompanying drawings, in which—

Figure 1 is a longitudinal section through a milk transporting tank embodying the present invention, the illustrated tank being shown as mounted upon an automobile truck trailer and having the air compressor carried at one side of the tank on the trailer;

Figure 2 is a transverse section on the line 2—2 of Fig. 1;

Figure 3 is a fragmentary detail showing the construction and arrangement of one form of air distributing conductor employed with the invention;

Figure 4 is a sectional detail on the line 4—4 of Fig. 1 showing particularly the shape of the dome near one end thereof;

Figure 5 is an enlarged longitudinal section through the tank at its rear end, this section being taken through the inlet for the agitating air and showing the unions for connecting the air intake at one end with the air distributing conductor and at its other end with the air compressor;

Figure 6 is a plan view of the air distributing conductor showing its location on the inside bottom wall of the tank and the readily removable connections for maintaining it in place;

Figure 7 is a section on the line 7—7 of Fig. 5 showing in detail the means for connecting the rear end of the air distributing conductor to the tank bottom to hold it temporarily in place during the air agitation;

Figure 8 is a fragmentary detail showing a modification of the locations of the air jet openings through the conductor;

Figure 9 is a plan view of a modified distributing conductor construction in which the conductor, instead of being formed of a metal, is formed of a flexible plastic with reinforcing metal ribs at its edges;

Figure 10 is a fragmentary view of the part of the conductor, shown in Figure 9, which is at the front end of the tank, the conductor being shown in its inflated condition;

Figure 11 is an enlarged sectional view of the same end of the conductor taken on the line 11—11 of Figure 10;

Figure 12 is a fragmentary view of the same end of the conductor shown in Figure 10, the conductor being shown in its deflated condition;

Figure 13 is a plan view of still another conductor construction, this view showing a conductor molded from a self-sustaining plastic, with small magnets molded into the edges thereof at intervals to hold it in position on the tank bottom when agitating air is being forced therethrough;

Figure 14 is a section on the line 14—14 of Figure 13;

Figure 15 is a plan view of a compressor mechanism adapted to supply the compressed air for agitation to the agitator of the present invention, this view illustrating the two driving motors for the compressor, one adapted to be run with current furnished by the truck battery power and the other adapted to be run by current supplied from an ordinary building electric wiring system;

Figure 16 is a section on the line 16—16 of Fig. 17 through the two V-belt driving pulleys used respectively in driving the air compressor from the two differently powered motors, this section also being taken through the automatic clutches for the respective V-belt pulleys;

Figure 17 is a section on the line 17—17 of Fig. 16, and

Figure 18 is a section on the line 18—18 of Fig. 16.

In the embodiment of the invention which is shown in Figs. 1 to 8 inclusive, the agitating mechanism of the present invention is shown as applied to a milk tank carried upon an automobile truck trailer. The tank 2 shown in the drawings has the usual convex ends 4 and 6 and is of substantially elliptical transverse section except as this ellipse is modified by the dome 8 and manhole 10. The tank 2 is mounted upon a supporting housing 12 constituting a part of the trailer frame and within this housing the air compressor 14 and its alternative driving motors 16 and 18 are located. The tank 2 is preferably of the usual construction and comprises inner and outer walls 20 and 22 of stainless steel between which the insulation 24 is located.

The conductor 26 for the agitating air, in the form of the invention shown in Figs. 1 to 8, inclusive, is of U-shaped section for convenience in sterilizing it and, like the other parts that come in contact with the milk, is preferably also of stainless steel. We have found that a conductor, with a capacity for effecting quick and thorough agitation of a 3500 gallon tank may be formed of a 2-inch stainless steel tubing by removing from one side thereof a 120° segment and then bending the two 30° segments projecting beyond each end of the tube diameter out to form the straight sides of the U-section.

Although in actual practice it is more convenient to locate the conductor 26 on the inner bottom wall of the tank, with its normally open side against said wall, it has been found that actual conduction of the agitating air may be effected through the conductor 26 when it is supported in horizontal position with its open side down and submerged sufficiently for effective agitation, the liquid displaced by the air passing through the conductor serving as a closure wall for the normally open side of the conductor. As shown in Figs. 1 to 8 inclusive, the conductor 26 is located at the lowest part of the inner bottom wall of the tank 2 and is preferably removably secured to this wall during the agitating operation, or until the contents of the tank have been completely discharged, to avoid lateral displacement thereof.

As shown more particularly in Figs. 1 and 6, the end of the conductor remote from the intake end, that is the end which is at the front end of the tank 2, has a downturned part 28, the lower edge of which is flush with the side edges of the conductor to prevent escape of the agitating air at this end and thus insure its discharge through the jet openings 30. The jet openings 30 are placed preferably at uniform intervals along the length of the conductor 26 and the agitating air, as more fully described hereinafter, is introduced through the rear end wall 6 of the truck and into the rear end of the conductor 26. To insure substantially uniform distribution of the air throughout the length of the tank, the jet openings nearest the air intake are preferably of smaller diameter than those most remote from the air intake. In a tank such as herein illustrated, which may, for example, be 22 feet in overall length, the jet openings 30 may be spaced along the conductor at 18" intervals and may vary in diameter from $\frac{3}{32}$ of an inch near the point of introduction of the compressed air, that is at the rear of the conductor, to a diameter of $\frac{3}{16}$" at the front end of the tank or at the end of the conductor most remote from the intake. The jet openings are preferably provided with countersinks from the outer surface of the conductor inward so that the jet openings have quite sharp discharge edges. For example, a $\frac{3}{32}$" hole may have a $\frac{1}{16}$" countersink.

As hereinabove suggested, provision is preferably made for removably connecting the conductor 26 to the tank bottom and to this end, as shown more particularly in Figs. 1, 6 and 7, the tank is provided near the two ends of the conductor with pins 32 and 34, the pin 34 extending upward from the tank bottom and the pin 32 extending up from the top of tube 44. The pins 32 and 34 are respectively arranged to project through openings 36 and 38 in the top of each end of the conductor 26, when the conductor is placed in position on the tank bottom, the parts of the pins 32 and 34 which project above the conductor top being provided with annular grooves 40 for receiving a hairpin-like clip 42 by which the conductor may be secured in position on the pins 32 and 34. The connections to the exterior of the tank 2 through which compressed air may be introduced into the conductor 26 are show generally in Fig. 1 and more in detail in Fig. 5. These connections comprise a stainless steel tube or pipe 44 extending through the rear wall 6 of the tank and secured permanently in position therein as, for example, by welding 46. At its inner end the tube 44 is provided with an inturned flange 47 which is adapted to hold in position, when the air intake valves are inserted in the tube 44, a disc-like part 48 having about its periphery a rubber gasket 50. The disc 48 constitutes a valve seat and is provided with openings 51, normally held in closed condition, to prevent escape of milk from the tank, by a valve 52 pressed into seated condition on the disc 48 by a spring 56 bearing at one end against a pin 58 in a central rod 60 extending through the disc 48 into the interior of the tank. A threaded collar 62, welded to the tube 44, at 64 is provided with a conical seat 66 into which fits a closure 68 having a corresponding conical edge, the closure 68 being held in seated relation to the seat 66 by an inwardly flanged clamping nut 70, the flange 72 of which overhangs a shouldered part of the closure 68. A socket-like depression 74 on the inner face of the closure 68 receives the rounded end of the rod 60 when the parts are in assembled relation.

Also slidably mounted on a reduced part of the rod 60, and bearing against a shoulder 76 thereon when in operative position, is a second valve mechanism comprising a block 77 having openings 78 therethrough and having a hub-like extension 79 on which a valve 80, for holding the opening 78 normally closed, is mounted and is pressed into closing relation to the openings 78 by a spring 81 confined between a clip on the hub 79 and the said valve 80. As above suggested, the block 77 is slidably mounted on the reduced part of the rod 60 and is limited in its sliding movement thereon by the shoulder 76 and a pin 82, such sliding movement being brought about as more fully set forth hereinafter.

When the block 77 is at the left hand limit of its sliding movement, that is, when it is bearing against the pin 82 it uncovers a drainage opening 83 in the tube 44 so that any milk that may have seeped through the valve openings 51 into the space between the disc 48 and the valve 80 or block 77 may drain away. Release of the air pressure behind the block 77 permits the compressed air in front of it to move the block against pin 82.

As shown in Figs. 1 and 5, air for agitating the milk in the tank is conducted from the compressor 14 through pipe 84, through a filter 85 and through a connecting tube 86 into the conduit 44. The tube 86 may be removably screwed into an opening 87 in the closure 68 hereinabove described.

From the foregoing description it will be seen that the valve mechanism may be removed bodily from the tube 44 by simply unscrewing the inwardly flanged nut 70 and removing the closure 68 and the connected filter 85 thus leaving the tube 44 free for cleansing purposes and making the valve parts also available for cleaning.

When the parts are in assembled relation as shown in Fig. 5, the valve block 77 will be in its rear-most position, that is, against the pin 82 until compressed air is introduced behind the block 77 through the tube 86. The introduction of the compressed air through the tube 86 will move the block 77 forward until its hub 79 engages the shoulder 76 on the rod 60. Pressure of the compressed air will then open the valve 80 and as it builds up in the chamber beyond the valve 80 will open the valve 52 and introduce the air into the agitating system of the tank. Air thus forced into the conductor 26 through the tube 44 is discharged into the milk in the tank through the jet openings 30 in the top of the conductor 26 and bubbles up through the milk carrying some of the milk with it and causing a circulation similar to that caused by boiling. When the conductor 26 is located as shown along the middle line at the bottom of the tank extending lengthwise thereof the agitation will take place as shown in Fig. 2, that is, there will be a circulation of the milk up at the center and down over the two side walls of the tank causing a complete agitation of all parts of the milk in the tank and particularly causing those parts of the milk in which, because of the rising of the cream therein, there has been a greater concentration of butterfat, to be carried down and mixed with those parts of the milk from which the cream has risen.

As hereinabove suggested, this agitation caused by forcing jets of air through the milk will necessarily cause some aeration of the milk and some slight foaming. To provide space for the escape of the air as it emerges from the upper surface of the milk, for any expansion of the milk due to aeration and for such splashing and slopping as might take place in an ordinary milk tank with the manhole opening extending on all sides substantially to the upper surface of the milk, the dome 8 has been provided. It has been found by experiment that this dome 8 may be of the shape shown in Figs. 1, 2 and 4 of the drawings and serve fully the purposes for which it is intended. The dome shown in these figures has its greatest width and its greatest height above the top level of the milk in the tank at the manhole 10. Here the walls of the dome merge with the vertical walls 88 of the manhole in the manner shown in Fig. 2, the side walls 88 of the manhole coming down to the original elliptical section of the tank on the two ends of the transverse dimension of the manhole and merging with the dome at the two ends of the longitudinal dimension of the manhole, using the terms "transverse" and "longitudinal" to describe those dimensions of the manhole which correspond to the transverse and longitudinal dimensions of the tank. From these junctions with the manhole, where the dome has its greatest vertical and transverse dimensions, the dome, as shown in Figs. 1, 2 and 4, tapers in both dimensions to points near the two ends of the tank where it merges eventually with the original elliptical section of the tank.

In the modified form of the air distributing conductor shown in Fig. 8 of the drawings, the jet openings for the escape of the agitating air are shown as notches 90 in the bottom edges of the conductor 26. We have found in practice, however, that jet openings in the top of the conductor produce the most satisfactory agitating results.

In Figs. 9, 10 and 11 is shown a modified form of conductor made of a suitable flexible plastic 92 which is readily sterilizable and is not of a composition that is affected by contact with milk. In this form of the invention a wire reinforcement 94, preferably extending around the end of the conductor 92 remote from the intake, when held against the tank bottom by threaded pins 95 projecting therefrom and adapted to receive wing nuts 96 for clamping the frame members 94 against the tank bottom, serves as a support for the flexible conduit when inflated, as shown in Fig. 10. As in the form of the invention shown in Figs. 1 to 8 inclusive, the jet openings 98 in this plastic form of conductor preferably increase in diameter from the intake end to the end most remote therefrom, so as to insure uniform agitating air jets throughout the length of the conductor.

In the form of the invention shown in Figs. 13 and 14, a conductor 100, preferably molded from a plastic that keeps its U-shaped section, has molded into integral flanges 102 thereon small magnets 104 of any suitable high magnetic alloy, such as those sold under the trade name "Alnico," whereby the conductor 100 may be anchored in its preferred location by the attraction of the magnets for the tank bottom. It will be noted that in this form of conductor also the jet openings 106 therein increase in diameter from the intake end to the end most remote therefrom, thereby insuring uniform jet action.

Air compressor mechanism suitable for supplying compressed air to the distributing conductors hereinabove described is shown generally in side elevation in Fig. 1 of the drawings and in plan in Fig. 15 and, as above suggested, comprises a suitable compressor 14, one motor 16 for driving the compressor which may receive its power from a truck battery, for example a 12 volt battery, and another motor 18 for alternately driving the compressor which may receive its power from any ordinary building or plant electric wiring system, that is, a system supplying current at from 110 to 120 volts.

In Figs. 15 to 18 inclusive are shown the automatic driving connections between the motors 16 and 18, respectively, and the compressor 14.

As shown more particularly in Fig. 16, there is keyed to the compressor driving shaft 108 a clutch drum 110 on which are mounted two V belt pulleys 114 and 116, the V belt pulley 114 being normally connected by a V belt 118 with a V belt pulley 120 on the driving shaft of the motor 16 and the V belt pulley 116 being normally connected by a V belt 122 with a V belt pulley 124 on the driving shaft of the motor 18.

Means are provided for clutching the respective pulleys 114 and 116 to the clutch drum 110 whenever the motor which drives either of said pulleys is actuated, the clutch means for the pulley 114 comprising rollers 126 in recesses 128 opening into said pulley from the drum 110 and so tapered that, when the pulley 114 is rotated in the direction shown by the arrows in Fig. 17, it will clutch the drum 110 and drive the shaft 108 of the compressor in the direction there shown. It will be seen by an inspection of Fig. 18 that rotation of the shaft in the direction shown in Fig. 17 will cause the rollers 130 of the clutch associated with the pulley 116 to roll into the high spots of the tapered recesses 132 in the pulley 116, thus permitting the drum to turn within the pulley 116. When, however, the pulley 116 is driven by its belt connection to the motor 118 in the direction shown by the arrows in Fig. 18, the rollers 130 will be forced into the low parts of the recesses 132 in the pulley 116 and thus clutch the pulley 116 to the drum 110 and rotate it in the direction shown by the arrow in Fig. 18. The shaft 108 of the compressor will operate the compressor mechanism equally well when turned in either direction and therefore whether the compressor be driven from the motor 16 or from the motor 18 it acts to supply compressed air for the agitating means of the present invention.

We have found in practice that the amount of air required to effect the desired agitation of the contents of a tank, such as herein shown, varies somewhat according to the depth of the milk or other liquid in the tank. It has been found, for example, that with a tank of the proportions herein shown, having a capacity of 3500 gallons, satisfactory agitation can be obtained by supplying about 7 cubic feet per minute of air to the distributing conductor at a pressure at the intake end of the conductor of perhaps 5 or 6 pounds per square inch. This usually means that the compressor 14 has to supply the line leading to the air filters, to be more fully described hereinafter, with an initial pressure of about 16 pounds to take care of the pressure drop through the filters.

With air supplied in the manner just described, a thorough agitation of the contents of a 3500 gallon tank and a complete dispersion of the butterfat content throughout the milk in the tank can usually be effected in from 7 to 10 minutes.

What is claimed as new is:
1. Means for effecting the agitation of the contents of a liquid containing tank comprising, in combination with the tank, a removable open-sided conductor adapted to form, when submerged in the liquid with its open side down, a conduit for an agitating aeriform fluid under pressure, said conductor having jet openings therethrough at intervals throughout its operative length and above its bottom edges, and means for introducing a suitable agitating aeriform fluid under pressure into the fluid distributing conduit thus formed, including a valved pipe connectible to one end of said removable conductor and extending through a wall of said tank, the other end of said conductor being closed, the tank, of continuously curved, approximately uniform transverse section and longitudinally elongated, having on its top side an anti-splash and anti-slop dome for receiving the agitating fluid as it emerges from the surface of the agitated liquid, said dome having therein a manhole at its highest point and itself tapering in both transverse dimensions to the curved transverse section near the tank ends.

2. Means for effecting the agitation of the contents of a liquid containing tank comprising, in combination with the tank, a removable open-sided conductor adapted to form, when submerged in the liquid with its open side down, a conduit for an agitating aeriform fluid under pressure, said conductor having jet openings therethrough at intervals throughout its operative length and above its bottom edges, and means for introducing a suitable agitating aeriform fluid under pressure into the fluid distributing conduit thus formed, including a valved pipe connectible to one end of said removable conductor and extending through a wall of said tank, the other end of said conductor being closed, the intake pipe being a part of the permanent structure and the valve mechanism in said pipe being bodily withdrawable from the outside of said tank for cleaning, a removable pipe closure, provided with a compressed fluid intake, serving to hold said valve mechanism in operative position.

DAVID S. BROWN.
CHARLES F. HAWES.
RALPH E. STORK.

REFERENCES CITED

The following references are of record in the file of this patent:

UNITED STATES PATENTS

| Number | Name | Date |
|---|---|---|
| 115,605 | Harly | June 6, 1871 |
| 214,009 | Sears et al. | Apr. 8, 1879 |
| 950,825 | Pill | Mar. 1, 1910 |
| 969,257 | Eckmann | Sept. 6, 1910 |
| 1,201,395 | Vissering | Oct. 17, 1916 |
| 1,370,531 | Fowler | Mar. 8, 1921 |
| 2,225,437 | Nordell | Dec. 17, 1940 |
| 2,301,203 | Doane | Nov. 10, 1942 |